United States Patent
Hoese et al.

[11] Patent Number: 6,148,421
[45] Date of Patent: Nov. 14, 2000

[54] ERROR DETECTION AND RECOVERY FOR SEQUENTIAL ACCESS DEVICES IN A FIBRE CHANNEL PROTOCOL

[75] Inventors: Geoffrey B. Hoese, Austin; Brian R. Smith, Round Rock; Robert A. Reynolds, Pflugerville, all of Tex.; Neil T. Wanamaker, Santa Cruz, Calif.

[73] Assignee: Crossroads Systems, Inc., Austin, Tex.

[21] Appl. No.: 09/087,684

[22] Filed: May 29, 1998

Related U.S. Application Data

[60] Provisional application No. 60/048,120, May 30, 1997.

[51] Int. Cl.[7] .................................................. G06F 11/00
[52] U.S. Cl. ........................................ 714/50; 370/453
[58] Field of Search ................. 714/50, 2, 4, 5, 714/7, 8, 12, 15, 18, 21, 25, 39, 48, 49; 370/453, 404, 405, 905, 907

[56] References Cited

U.S. PATENT DOCUMENTS

| | | | |
|---|---|---|---|
| 5,260,933 | 11/1993 | Rouse | 370/14 |
| 5,422,893 | 6/1995 | Gregg et al. | 371/32 |
| 5,581,566 | 12/1996 | St. John et al. | 371/37.6 |
| 5,588,140 | 12/1996 | Misukanis et al. | 395/500 |
| 5,598,541 | 1/1997 | Malladi | 395/286 |
| 5,638,518 | 6/1997 | Malladi | 395/200.21 |
| 5,724,363 | 3/1998 | Breya | 371/5.5 |
| 5,740,186 | 4/1998 | Widmer | 371/37.1 |
| 5,784,387 | 7/1998 | Widmer | 371/37.1 |
| 5,793,770 | 8/1998 | St. John et al. | 370/441 |
| 5,805,924 | 9/1998 | Stoevhase | 395/831 |
| 5,809,328 | 9/1998 | Nogales et al. | 395/825 |
| 5,944,798 | 8/1999 | McCarty et al. | 709/251 |
| 5,959,994 | 9/1999 | Boggs et al. | 370/399 |
| 6,014,383 | 1/2000 | McCarty | 370/453 |

*Primary Examiner*—Nadeem Iqbal
*Attorney, Agent, or Firm*—Gray Cary Ware & Freidenrich, LLP

[57] ABSTRACT

A method and system for detecting and correcting error conditions on sequential devices in a private loop direct access fiber channel network respectively include the steps and instructions for determining the state of an exchange using an initiator and initiating an appropriate sequence level recovery using the initiator. The invention further includes determining whether a target response is overdue using a timer in conjunction with internal driver state information for indicating that packet information may have been lost. The invention further requests exchange and sequence state information from the target for determining the need for corrective action and takes the needed corrective action, such as resending sequence information, requesting that the target resend sequence information, or providing early indication to the ULP that an error has occurred.

20 Claims, 6 Drawing Sheets

REPORT NORMAL
COMPLETION TO ULP

REQUIRES PERSISTENCE
OF ESB DATA

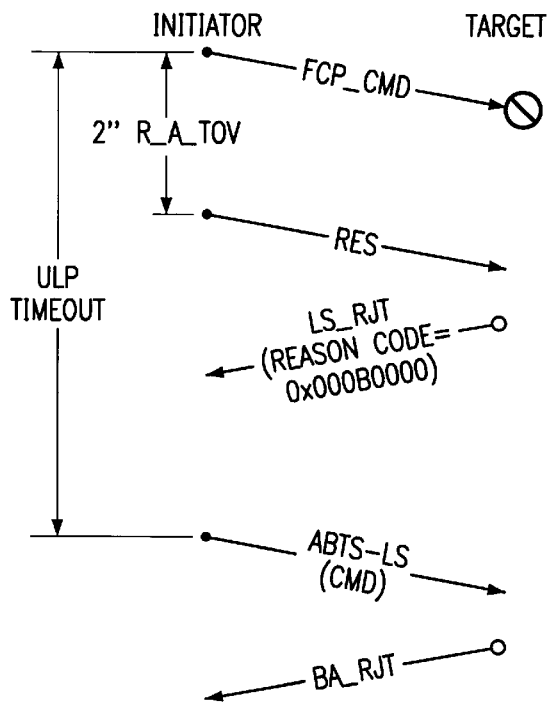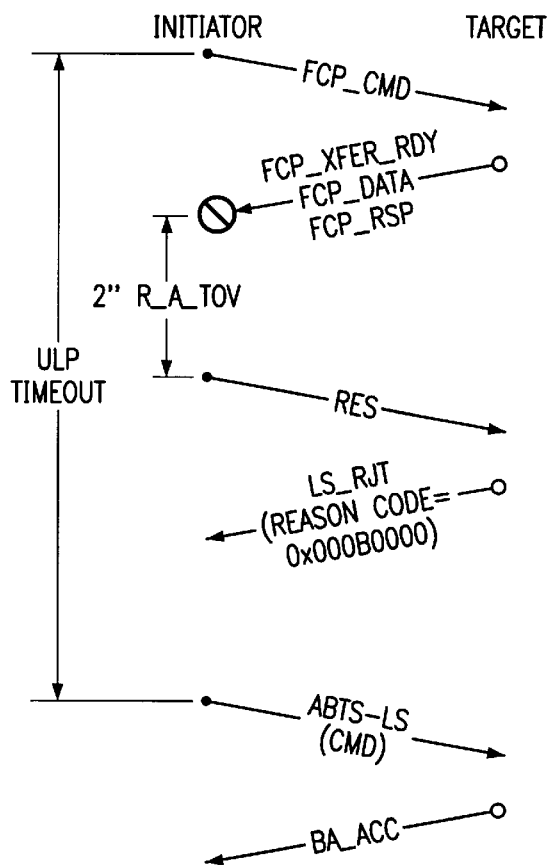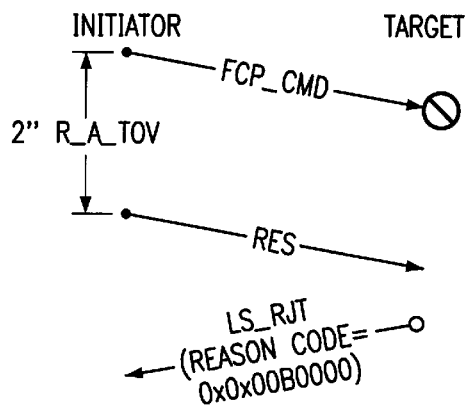

ERROR DETECTION AND RECOVERY FOR SEQUENTIAL ACCESS DEVICES IN A FIBRE CHANNEL PROTOCOL

TECHNICAL FIELD OF THE INVENTION

This application claims priority to the provisional application filed on May 30, 1997, which was accorded Ser. No. 60/048,120. The present invention relates generally to error detection and recovery in a sequential access devices in fibre channel private loop direct access (FC-PLDA) and more particularly to an error detection and recovery method for sequential access devices that provides the ability for the initiator to determine the state of an exchange and initiate appropriate sequence level recovery.

BACKGROUND OF THE INVENTION

Problems exist in PLDA networks using FCP in detecting and correcting error conditions on sequential access devices, such as tapes. The basic causes of these problems include the lack of a guaranteed delivery protocol and the implicit state information intrinsic to sequential access devices. More specifically, lost frames in FCP can result in FC information units being lost. Upper level protocol (ULP) recovery is not sufficient for a variety of reasons, including an inability to detect such errors, the effort required to implement recovery mechanisms, and the extended time required to detect and recover from error conditions.

The problem not being able to detect and correct error conditions stems from the fact that fiber channel in this environment provides a capability to perform operations that would normally be performed on a parallel bus. With FCP PLDA devices, operations are being performed on a serial data gram delivery service where packets of information may be lost.

Whereas on a parallel bus immediate feedback and acknowledgment occurs thus guaranteeing robust delivery with immediate state information between two devices on the bus that may be communicating, the FCP PLDA environment does not possess these characteristics.

On stream and media changer devices there are two classes of commands for which it is critical to know whether the command was accepted by the target, and then whether successful completion of the command occurred. The first class of commands, which is unique to these devices, are those that alter the media state or content in a way that simply re-executing the command will not recover the error. One such command set is the read/write/position/write filemarks, for which the tape is repositioned past the referenced block(s) or files only if the operation started. These commands control how far the operation continued. For these commands, it is critical to proper recovery to know this information. Also, the move medium/load/unload medium commands are important, which may have actually hanged the medium in the target. Unfortunately, these comprise most of the commands issued during normal operation of the subsystem.

The second class of commands are not unique to these devices. With these commands information may be lost if the command is presumed to have been sent by the target, but not received by the initiator. These commands include request sense and read/reset log. Loss of sense data also may affect error recovery from failed commands of the aforementioned media move/change class, but it may also affect proper error recovery for cached/RAID disk controllers as well.

On a parallel SCSI bus, the host adapter has positive confirmation that the target accepted the command by the fact that the target requested all bytes of the CDB and continued to the next phase without a Restore Pointers message. Such confirmation is only implicit in a serial protocol by receipt of a response message, such as transfer-ready or response. In cases of some commands, this implicit confirmation may require a lengthy period of time, during which mechanical movement requiring several multiples of E_D_TOV occurs. In FLA environments, however, R_A_TOV may be the appropriate value. Similarly, the target has positive confirmation that the host has accepted sense or log data immediately upon completion of the data and status phases. This data, once received by the target, may now be reset. In a serial environment, this is only implicit by receipt of the next command. Note that a change to the target to only clear sense/log data on receipt of a command other than request sense or read/reset log would eliminate this problem.

The errors that are of concern are where FCP information units are lost in transit between an FCP initiator and target. The cause for such loss is not specific, but is assumed to be cases where a link level connection is maintained between the target and initiator, and some number of FCP IU's are dropped. Other cases are either handled by PLDA through existing methods, or may be generally classified as unrecoverable and treated in a fashion similar to a SCSI bus reset.

In order to meet the defined requirements, any proposed solution must enable the initiator to make the following determinations. In particular, there is a need for a method of enabling the initiator to determine that an error condition occurred (an FCP IU is expected and not received, or not responded to). There is a need to be able to determine whether an FCP-CMND was received by the target.

If the command is a FCP-DATA command, there is a need to determine whether it was received or sent by target. If the command is a FCP XFER-RDY or FCP-RSP command, there is a need to determine whether it was sent by target. There is also the need for the solution to work in a Class 3 environment, preferably with no change to existing hardware. The tools prescribed in FC-PH for FC-2 recovery are the Read Exchange Status (RES), and Read Sequence Status (RSS) Extended Link Services, and the Abort Sequence (ABTS) Basic Link Service. RES is an appropriate tool for the host adapter to use. Its function is to inquire of the status of an operation during and for some period of time after its life. Unfortunately, in several of the cases of interest, the RX_ID is unknown to the exchange initiator.

In these cases, the initiator must use an RX_ID of OxFFFF, which, combined with the FC_PH wording that the Responder destination N_Port would use RX_ID and ignore the "OX_ID." This means that if the Responder had not received the command frame, the RES would be rejected. On the other hand, if the Responder had received the command and sent the FCP_RSP response frame, the RES would be rejected, in both cases with the same reason code. Only in the case where the command was in process, but no FCP_RSP response frame had been sent by the Responder, would a useful response be sent. Real implementations appear to search for the S_ID—OX_ID pair when the RX-ID is set to OxFFFF in the RES request. This behavior is necessary for proper network operation.

Further, even if upon implementating change, in the case of a non-transfer command, it is impossible to detect the difference between a command that was never received and a command whose response was lost unless the target retains ESB information for a period of R_A_TOV after the exchange is closed.

Similar arguments apply to the use of the RSS, though the wording of the applicable section uses the word "may" rather than "would". ABTS, while recommended in FC'-PH for use in polling for sequence delivery, is always interpreted as an abort of the exchange in FC-PLDA, and is therefore not useful for this purpose.

SUMMARY OF THE INVENTION

According to one aspect of the present invention, there is provided a method for detecting and correcting error conditions on sequential devices in a private loop direct access fibre channel network that includes the steps of determining the state of an exchange using an initiator. Initiating an appropriate sequence level recovery using the initiator is a next step of the present method. The method further includes determining whether a target response is overdur using a timer in conjunction with internal driver state information for indicating that packet information may have been lost. Next, the present invention includes requesting exchange and sequence state information from the target for determining the need for corrective action. Furthermore, the method includes taking the needed corrective action. The corrective action may be, for example, resending sequence information, requesting that the target resend sequence information, or providing early indication to the ULP that an error has occurred.

The present invention includes numerous technical advantages. For example, the present invention provides the ability to recover from lost packets in FCP for sequential access devices. The present invention makes possible interoperability with block and sequential access devices. No or minimal changes are required to FC-PH and PLDA and no additional protocol overhead for normal operation is needed for system implementation. The present invention also provides the advantage of being able to implemented within existing silicon or chips for the target and initiator devices.

The present invention provides a mechanism whereby the initiator of an operation may determine that a state exists in which a problem may have occurred. Once the initiator determines that some information may not have been received, it can direct a request to the target device. This information going back from the target device allows the initiator to make the determination of either that all operations are satisfactory or that some particular functional operation or data failed to reach the target. The present invention provides a recovery mechanism.

The present invention minimizes the time to detect and recover the error condition globally. It provides a faster way than the ULP possesses to initiate and complete recovery. With prior technology, upon losing data the ULP simply repeated the sequence of operations rather than reconstruct the missing portions. The invention, to the contrary, provides a method to recover data which did not previously exist.

Another technical advantage that the present invention provides is a high degree of interoperability with block and sequential access devices. By working within the FCP protocol, the present invention works well with disk devices, type devices, and other types of sequential or block devices.

Another technical advantage that the present invention provides is that it may be implemented with no or minimal changes to FC-PH and PLDA. The present invention uses the read exchange status (RES), an existing FCP mechanism, to achieve its results. Accordingly, there are, no changes needed to the FCP protocol to implement the invention. Changes to devices, therefore, are not needed for basic interoperability of the present invention.

Still another technical advantage of the present invention is that there are no additional protocol overhead changes or additions for normal operation.

In both the normal operational case and the lengthy command case. By using a timer and not initiating a recovery operation, the present invention will pass the point that a command would work. This represents a low percentage of line utilization.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 11 and 13 show the response to the RES being an LS-RJT; and

DETAILED DESCRIPTION OF THE INVENTION

Figure 1:
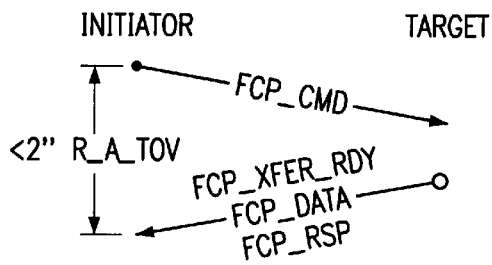
FIG. 1 shows an example of the ideal initiator-target exhange to which the present invention applies.
Figure 2:
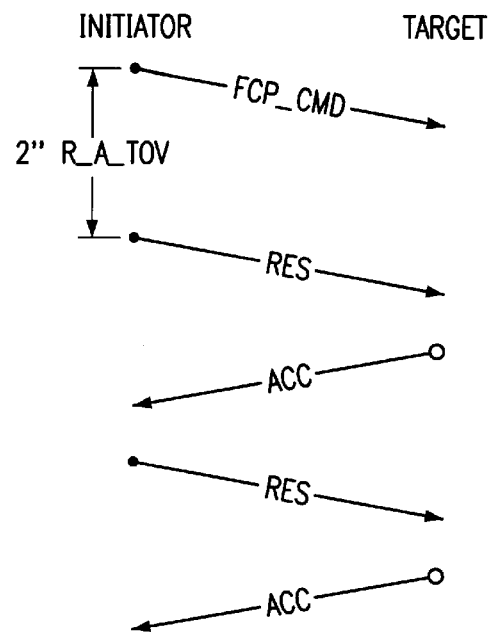
FIG. 2 shows the operation of FCP network in the absence of an ACC response from a target.

Preferred embodiments of the present invention are illustrated in the FIGURES, like numerals being used to refer to like and corresponding parts of the various drawings.

A method is proposed where the initiator determines the state of an exchange and initiates appropriate sequence level recovery. A timer is used in conjunction with internal driver state information to determine if a target response is overdue, indicating that packet information may have been lost. The initiator will then request exchange and sequence state information from the target, from which it can be determined if corrective action is necessary. The initiator can then resend sequence information, request that the target resend sequence information, or provide early indication to the ULP that an error has occurred. The most typical cases are lost data. Data or packets flow from an initiator device to a target device and responses coming back from the target device to the initiator. This is the normal operation of the FCP protocol wherein commands are sent.

In the case of a write command, the flow of events is that the initiator sends to the target an FCP command packet to change the command. The FCP command includes some configural information. One of the essential characteristics of the write command is that there is a data transfer from the initiator to the target. This permits the target to write that data. Before the data transfer takes place, the target must respond with a Transfer-Ready, which is an indication from the target to send data and how much data.

For the write there can be multiple Transfer_Readys or there can be only one. The Transfer_Ready goes to the target back to the initiator, so the initiator acts on that Transfer_Ready and begins to send data. The initiator sends three sequences of data, which can be collections of frames or it could just be individual frames or packets. The initiator responds as though it sent all three of these things. The little "NOT" sign basically means that somewhere between the initiator and the target, data was lost. It could be in the fabric or it could be an error on the target side. For some reason that data did not arrive at the target. At that point, the initiator thinks it sent everything. So it takes no further action and waits for a target response. The target has not seen everything, so it is not going to take any action. The target will wait for the intitiator to take some further action. So nothing happens for two times the R_A_TOV, which is the time it takes a packet to propagate through the fabric, the minimum time. By waiting two times the period required for the packet to propagate the intitiator can know that something should have happened by now.

The Read Exchange error recovery begins where the initiator sends to the target a Read Exchange Status (RES) request. The ACC from the target to the initiator contains data that will tell the initiator what sequences it has transmitted recently and what sequences it has received recently. So the initiator may examine the data at that point, to see that the target received are data element, but did not receive another and has not responded at all to that. So the initiator will know at that point that data was lost. Once the present invention makes the determination and classifies it, the RSI (Request Sequence Initiative) begins whereby the initiator tells the target it is the intitiator's turn to talk now. This permits detecting that there is an error and have classified where the error occurred at data 1. Then the data is then resent.

The timer used is based on the maximum frame propagation delivery time through the fabric. This is significantly less than typical ULP time out values, providing the capability to detect and correct errors before ULP actions take effect. The suggested time out for FLA environments is twice R_A_TOV, which is currently 2 seconds.

The suggested method of determining target sequence state is by using the RES extended link-service. It may be desirable to define a new service to provide this information, as the Exchange StatLis Block contains a significant amount of information not required for this purpose. Also, clarification of the ESB specification is required. Currently, it is unclear in FC-PH 28.1.1 as to certain required specifics needed to provide the information required to determine target state. The target device must maintain transmitted sequence status information as well as received sequence information. A description is given for a concise version of the exchange status and link service required as an optional method of providing the minimal set of information needed for implementation.

A new extended link service is also required to allow sequences to be resent. The description of this device is included below. This description is for Class 3 devices, however, the basic method can also be applied to Class 2 operation.

Figure 3:
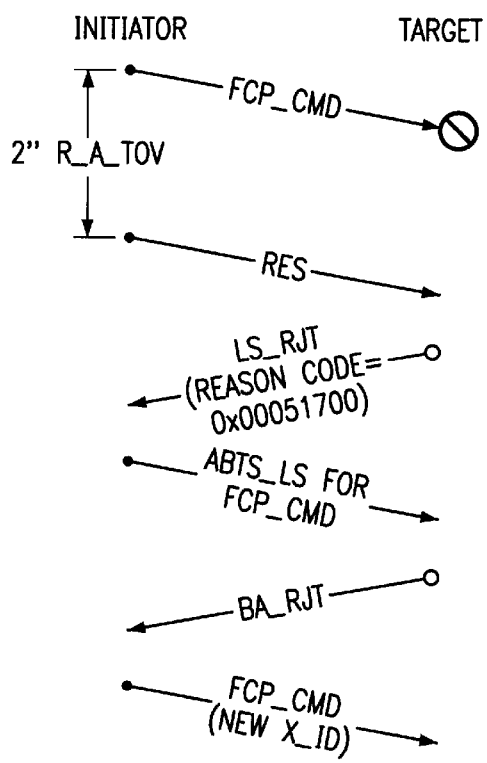
FIG. 3 illustrates the exhange between an intitiator and target in the instance of a LS_RJT response from the target.
Figure 4:
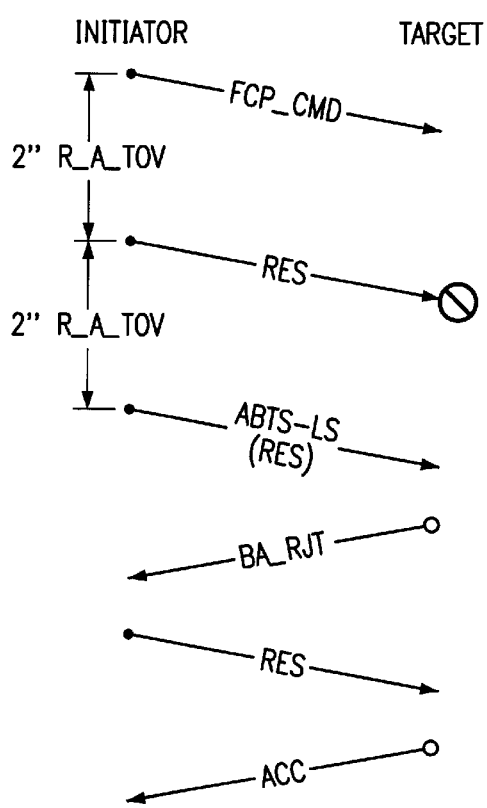
FIGS. 4 and 5 show the retrying of the RES at a rate not to exceed once per two R_A_TOV periods according to the teachings of the present invention.
Figure 5:
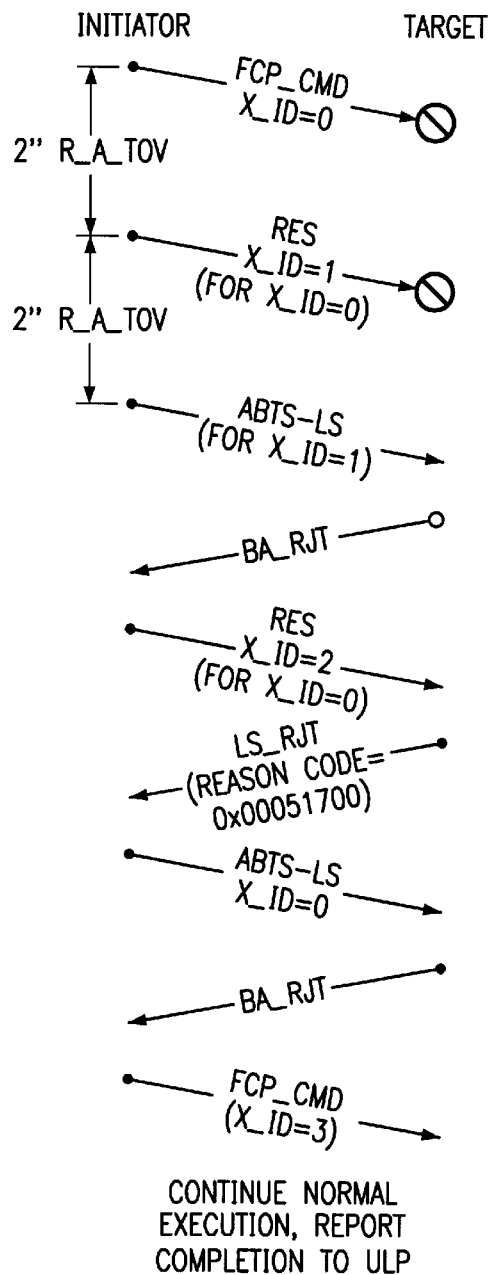

Details of the recovery mechanism are as follows. After 2×R_A_TOV with no reply received the target issue RES for the exchange containing the FCP CMD. The RES is in a separate exchange from the command. If there is no ACC response to the RES within 2×R_A_TOV, the initiator send ABTS to abort the exchange containing the RES. FIG. 3 illustrates this exchange. The RES may be retried at a rate not to exceed once per 2×R_A_TOV at the option of the initiator, as shown in FIGS. 4 and 5. If none of the RESs receives a response, the present method allows the ULP, Upper Level Protocol, timeout to occur, along with ULP recovery. The initiator may instead report an error condition to the ULP after failure of one or more RES.

If the response to the RES is an LS-RJT, with a reason code indicating that the function is not supported, as is required in PLDA for block devices, treat the target as a disk or other device not supporting the teachings of the present invention and allow normal ULP recovery to occur. FIGS. 11 and 12 show this type of situationthat goes to the extent of the ULP timeout.

If the FCP_CMND was not received by the target (i.e., the initiator receives an LS_RJT for the RES, with a reason code indicating that the OX_ID is unknown), the present method involves sending an ABTS link service frame to abort the original sequence/exchange, as FIG. 3 shows. Then the initiator may resend the command (using a new OX_ID). The target shall remain ESB information for 2×R_A_TOV after the response has been sent. In this way the initiator may determine the difference between a command that was never received and one whose reply sequences) were lost. If the ACC for an RES indicates that the FCP-CMND was received by the target, and that no reply sequence has been sent, the command is in process and no recovery is needed at this time.

At intervals of 2×R_A_TOV the RES may be retransmitted. if at any time, there is no reply to the RES, an ABTS is sent for the RES. FIGS. 4 and 5 depict this instance.

Figure 6:
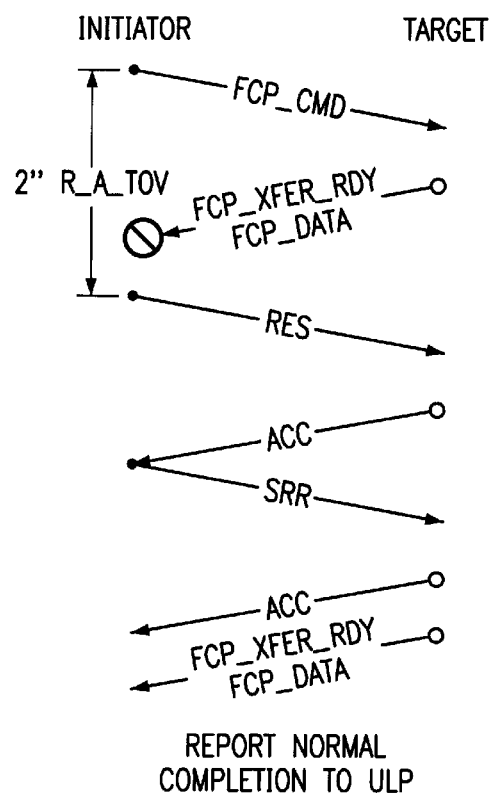
FIG. 6 shows the instance of an FCP_XFER_RDY signal sent by the target, but not received by the initiator, to depict still another aspect of the present invention.

If the ACC for the RES indicates that an FCP_XFER_RDY was sent by the target, but not received by the initiator, as FIG. 6 shows, the initiator will issue an SRR Extended Link Service frame to request sequence retransmission for the missing sequence. The target retransmits the FCP-XFER-RDY, with F_CTL bit 9 set, indicating that this is a retransmitted frame. When the FCP_XFER_RDY is successfully received, the data is sent, and the operation continues normally. No error is reported to the ULP, though the error counters in the LESB should be updated. If the SRR receives a LS_RJT, the next action should be to perform sequence error recovery as documented in FCP PLDA Sections 9.1 and 9.3.

The target shall return information about the status of sequences sent, as well as the status of sequences received. This is optional behavior in FC-PH, and is highly preferrable for FC-PLDA. Additionally, sequence identitifier usage in Class 3 should be specified in such a way that the target does not reuse sequence identifiers within an exchange.

Figure 8:
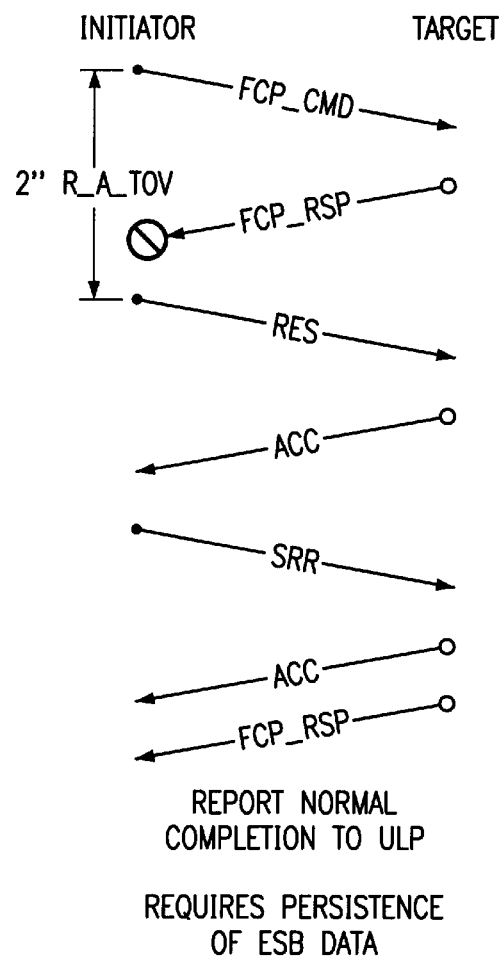
FIGS. 8 and 9 show the act of target retransmitting the FCP_RSP, as a retransmitted frame.
Figure 9:
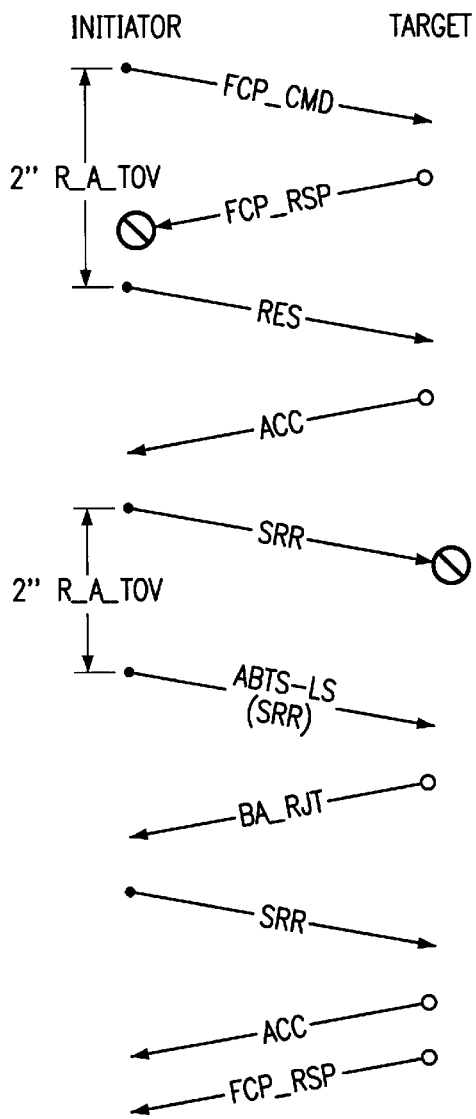
Figure 10:
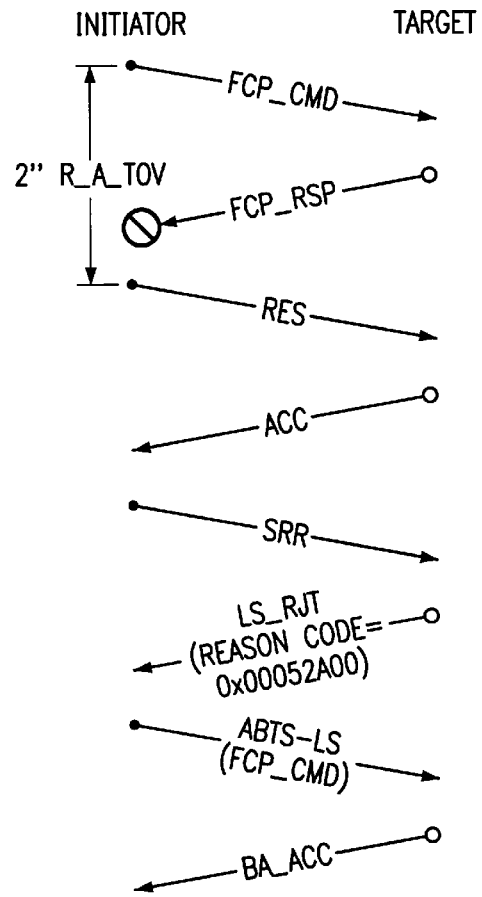
FIG. 10 depicts the aborting of the exchange between the intiator and target due to failure of the FCP_RSP from the target to reach the intiator.
Figure 14:
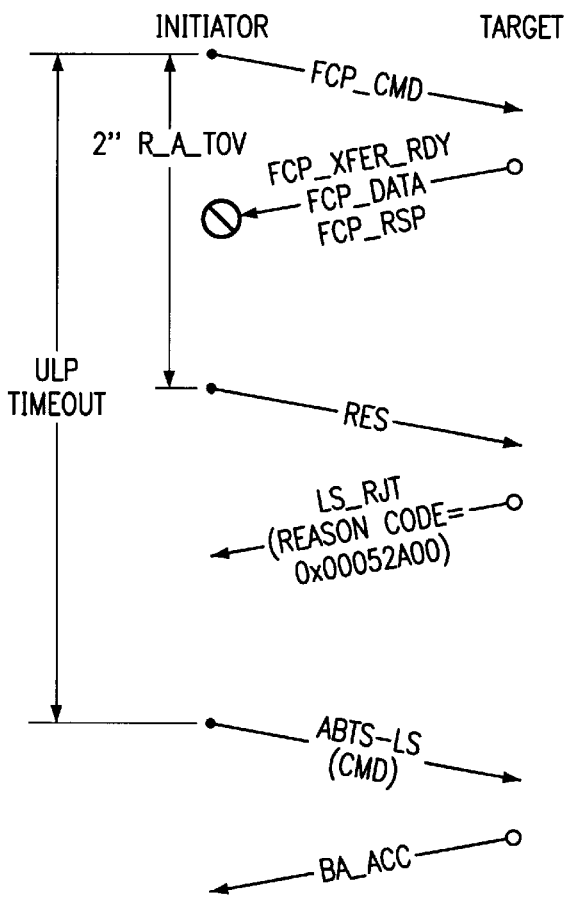
FIGS. 14 and 15 show how the present invention responds in the context of once lost data sequence of multiple data sequences.
Figure 15:
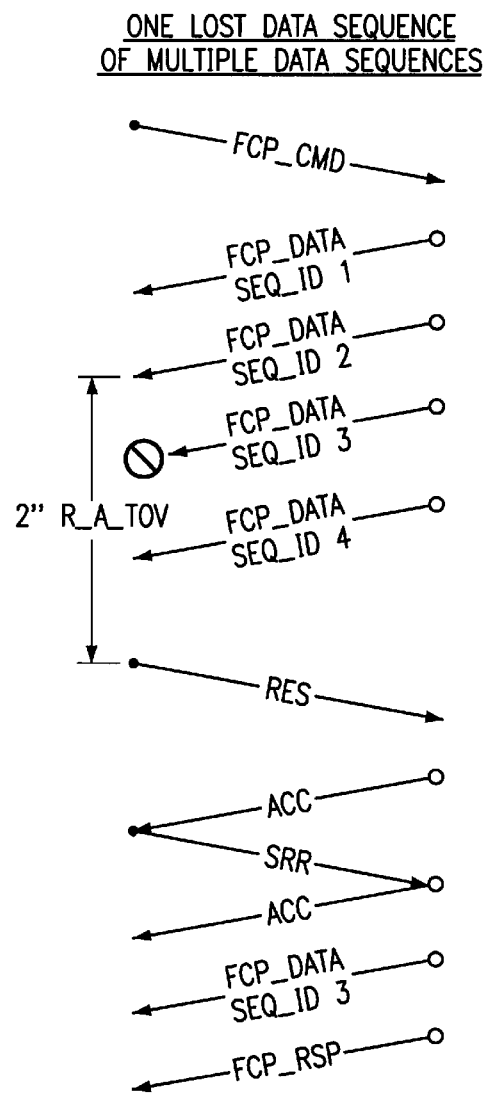

If the ACC for an RES indicates that an FCP_DATA sequence was sent by the target, but not received by the initiator, the present invention includes the response to issue an SRR Extended Link Service frame, as described below, to request retransmission of the sequence, or portion thereof, that was not successfully received. In this instance, the target retransmits the sequence, with $F_{CTL\ bit}$ 9 set in each data frame, to indicate that this is a retransmitted frame. The received data is delivered to the ULP, and no error is reported. If the SRR receives a LS_RJT, with a reason code indicating that the function could not be performed, and if the target does not present status within the ULP Limeout period, perform abort sequence error recovery as documented in the PLDA standard section 9.1, 9.3. If the ACC for an RES indicates that an FCP_RSP sequence was sent by the target, but not received by the initiator, issue an SRR Extended Link Service frame to request retransmission of the sequence. As FIG. 8 depicts, the present invention includes the target involves retransmitting the FCP_RSP, with F_CTL bit 9 set, to indicate that this is a retransmitted frame. The response is delivered to the ULP, and no error is reported. If the SRR receives a LS_RJT, perform abort sequence error recovery as documented in the FCP PLDA standard section 9.1, 9.3. Note that detecting this is unambiguous, as a lost sequence followed by a successfully received sequence would not have a continuously incrementing sequence count, as required for streamed sequences.

Figure 7:
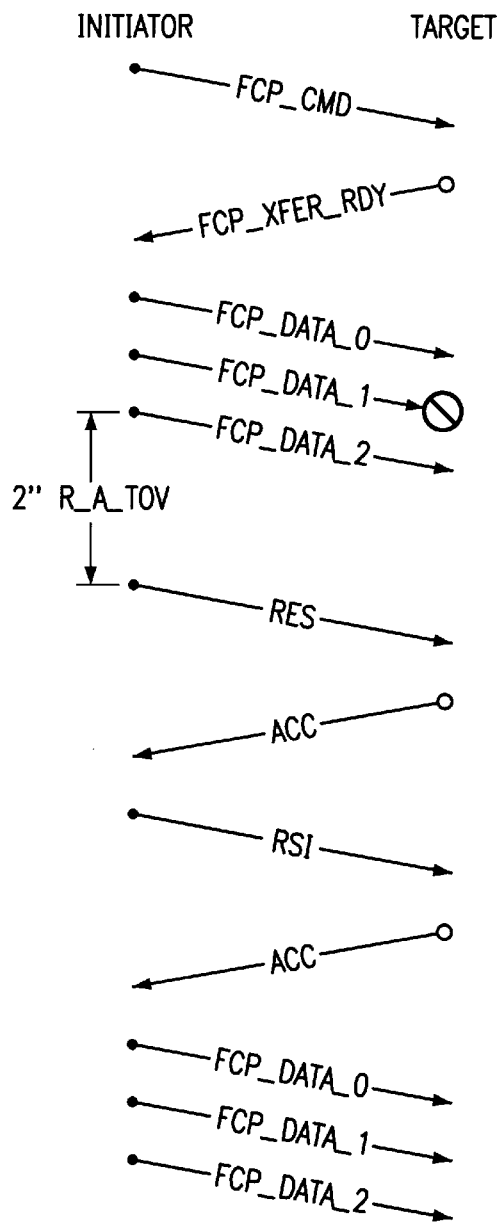
FIG. 7 shows still another sequence being retransmitted with the present invention.

If the ACC for an RES indicates that an FCP_DATA sequence was sent by the initiator, but not successfully received by the target, the initiator sends an RSI Extended Link Service to request sequence initiative. As documented in the FCP PLDA standard section 9.2, the target discards the sequence in error, but does not initiate any recovery action. FIG. 7 shows this aspect of the invention to include the feature that when the ACC is received for the RSI, the data sequence is retransmitted with $F_{CTI\ bit}$ 9 set in each frame, to indicate that this is a retransmitted frame. The operator should complete with no error indication to the ULP.

It is the responsibility of the initiator to determine the appropriate action (retry, allow ULP time out, or return status to ULP) required based on the information determined by RES and other internal state. As described in PLDA, the target does not initiate recovery action. Note that link recovery shall be treated as the equivalent of a bus reset. All open exchanges will be terminated, and a unit attention condition shall be generated.

The SRR (Sequence Resend Request) Extended link service frame follows the rules for extended link services as defined in the FC-PH Standard Rev 4.3, Section 23.1. A new Link Service command code in R_CTL needs to be added to FC_PH. The next available value is 0001 0011b. In the event that the target cannot accept this request, the target shall present a check condition as if it had not responded to an Initiator Detected Error with a Restore Pointers message. The target shall not reject requests for retransmission of FCP_XFER_RDY or FCP_RSP frames.

The SRR payload and reject codes are defined below. The ACC does not require a payload. The direction flag indicates to the target that the initiator is requesting sequence data transfer to (0) or from (1) the target. All other fields are as defined in the FC-PH Standard. The following Table 1 shows the item and size bytes for the SRR payload.

TABLE 1

| Item | Size Bytes |
| --- | --- |
| SEQ_ID | 1 |
| Direction | 1 |
| OX_ID | 2 |
| RX_ID | 2 |
| Low SEQ_CNT | 2 |
| High SEQ_CNT | 2 |

Read Exchange Concise (REC)

Another aspect of the present invention is the present invention includes the REC links service request that requests an N_Port to return information on completed sequences for the RX_ID or OX_ID originated by the S_ID specified in the Payload of the request Sequence. The specification of OX_ID and RX_ID may be useful or required information for the destination N_Port to locate the status information requested. A Responder destination N_Port would use the RX_ID and ignore the OX_ID, unless the RX_ID was undetermined (i.e. RX_ID=0xffff). An originator N-Port would use the OX-ID and the RX-ID. This function provides the N-Port transmitting the request with information regarding the current status of the exchange specified.

If the destination N-Port of the RES request determines that the SEQ_ID, originator S_ID, OX_ID, or RX_ID are inconsistent, then it shall reply with an LS_RJT sequence with a reason code that it is unable to perform the command request. The protocol for the REC links service request is that the read exchange concise request a sequence, and the ACC reply sequence occurs using the FT1 format.

Addressing occurs in which the S_ID field designates the source N-Port requesting the Exchange information. The D_ID field designates the destination N-Port to which the request is being made.

The format of the Payload is shown in Table 2. The payload includes an association header for the exchange if the destination N-Port requires X-ID reassignment.

TABLE 2

Table xx-REC Payload

| Item | Size -Bytes |
| --- | --- |
| hex '13000000' | 4 |
| reserved | 1 |
| Originator S-ID | 3 |
| OX_ID | 2 |
| RX_ID | 2 |
| Association Header (optionally required) | 32 |

Another aspect of the present invention includes a reply link service sequence in which the service reject (LS.RJT) signed signifies rejection of the REC command. An accept signal signifies that the N-Port has transmitted the requested data. The accept payload uses the formats of the Accept Payload as shown in Table 3. The format of the Concise Exchange Status is specified in the FCP PLDA Standard. Note that for a sequence to be reported as received, the entire sequence must have been successfully received. For a sequence to be reported as transmitted, the entire sequence must have been successfully transmitted.

TABLE 3

Table yy-REC Accept Payload

| Item | Size -Bytes |
| --- | --- |
| hex '02000000' | 4 |
| Concise Exchange Status (see 24.8.xx) | N |
| Association Header (optionally required) | 32 |

Although the present invention has been described in detail, it should be understood that various changes, substitutions and alterations can be made hereto without departing from the spirit and scope of the invention as described by the appended claims.

What is claimed is:

1. A method for detecting and correcting error conditions on sequential devices in a private loop direct access fibre channel network, comprising the steps of:
   determining the state of an exchange using an initiator; initiating an appropriate sequence level recovery using the initiator is a next step of the present method;
   determining whether a target response is overdue using a timer in conjunction with internal driver state information for indicating that packet information may have been lost;
   requesting exchange and sequence state information from the target for determining the need for corrective action; and
   taking the needed corrective action between said target and said initiator.

2. The method of claim 1, wherein said corrective action comprises resending sequence information.

3. The method of claim 1, wherein said corrective action comprises requesting that the target resend sequence information.

4. The method of claim 1, wherein said corrective action comprises providing early indication to the ULP that an error has occurred.

5. The method of claim 1, wherein said target response overdue determining step comprises the step of determining where two R_A_TOV periods have elapsed after initiating said exchange.

6. The method of claim 1, wherein said corrective action taking step further comprises the step of providing early indication to the ULP that an error has occurred in the event that no RES signal from the target receives a response.

7. The method of claim 1, wherein said corrective action taking step further comprising the step of determining the target to be a device not supporting recovery steps, in the event that the target response to the RES signal is an LS_RJT signal.

8. A system for detecting and correcting error conditions on sequential devices in a private loop direct access fibre channel network, comprising:
   instructions for determining the state of an exchange using an initiator;
   instructions for initiating an appropriate sequence level recovery using the initiator is a next step of the present method;
   instructions for determining whether a target response is overdue using a timer in conjunction with internal driver state information for indicating that packet information may have been lost;
   instructions for requesting exchange and sequence state information from the target for determining the need for corrective action; and
   instructions for taking the needed corrective action between the target and the initiator.

9. The system of claim 8, wherein said corrective action further comprises resending sequence information.

10. The system of claim 8, wherein said corrective action comprises requesting that the target resend sequence information.

11. The system of claim 8, wherein said corrective action Comprises providing early indication to the ULP that an error has occurred.

12. The system of claim 8, wherein said target response overdue determining instructions comprises instructions for determining where two R_A_TOV periods have elapsed after initiating said exchange.

13. The system of claim 8, wherein said corrective action taking instructions further comprise instructions for providing early indication to the ULP that an error has occurred in the event that no RES signal from the target receives a response.

14. The system of claim 8, wherein said corrective action taking instructions further comprise instructions for determining the target to be a device not supporting recovery steps, in the event that the target response to the RES signal is an LS_RJT signal.

15. A method for forming a system for detecting and correcting error conditions on sequential devices in a private loop direct access fibre channel network, comprising the steps of:
   forming instructions for determining the state of an exchange using an initiator;
   forming instructions for initiating an appropriate sequence level recovery using the initiator is a next step of the present method;
   forming instructions for determining whether a target response is overdue using a timer in conjunction with internal driver state information for indicating that packet information may have been lost;
   forming instructions for requesting exchange and sequence state information from the target for determining the need for corrective action; and
   forming instructions for taking the needed corrective action between said target and said initiator.

16. The method of claim 15, wherein said corrective action comprises resending sequence information.

17. The method of claim 15, wherein said corrective action comprises requesting that the target resend sequence information.

18. The method of claim 15, wherein said corrective action comprises providing early indication to the ULP that an error has occurred.

19. The method of claim 15, wherein said target response overdue determining forming step comprises the step of forming instructions for determining where two R_A_TOV periods have elapsed after initiating said exchange.

20. The method of claim 15, wherein said corrective action taking forming step further comprises the step of forming instructions for providing early indication to the ULP that an error has occurred in the event that no RES signal from the target receives a response.

* * * * *